(12) United States Patent
Girzon et al.

(10) Patent No.: US 6,378,017 B1
(45) Date of Patent: Apr. 23, 2002

(54) PROCESSOR INTERCONNECTION

(75) Inventors: Gary Girzon, Sudbury; Paul Kerr, Natick; Chuck Linton, Southborough, all of MA (US); Edward R. Coleman, San Diego, CA (US); Keith Leo, Framingham, MA (US)

(73) Assignee: NMS Communications Corporation, Framingham, MA (US)

( * ) Notice: Subject to any disclaimer, the term of this patent is extended or adjusted under 35 U.S.C. 154(b) by 0 days.

(21) Appl. No.: 09/112,253

(22) Filed: Jul. 8, 1998

(51) Int. Cl.[7] .............................................. G06F 13/00
(52) U.S. Cl. ....................... 710/129; 710/110; 710/126; 712/35
(58) Field of Search ................................ 710/110, 129, 710/128, 126, 131; 712/32, 35

(56) References Cited

U.S. PATENT DOCUMENTS

| | | | | | |
|---|---|---|---|---|---|
| 4,195,342 A | * | 3/1980 | Joyce et al. | ................. | 711/118 |
| 4,641,238 A | * | 2/1987 | Kneib | ........................ | 710/110 |
| 4,933,838 A | * | 6/1990 | Elrod | ............................. | 714/3 |
| 5,187,795 A | * | 2/1993 | Balmforth et al. | | |
| 5,717,875 A | * | 2/1998 | Cutlerywala et al. | ....... | 710/128 |
| 5,724,583 A | * | 3/1998 | Carmon et al. | | |
| 5,867,496 A | * | 2/1999 | Peres et al. | .................. | 370/376 |
| 5,978,953 A | * | 11/1999 | Olarig | ........................ | 714/768 |
| 6,021,451 A | * | 2/2000 | Bell et al. | .................... | 710/128 |
| 6,065,131 A | * | 5/2000 | Andrews et al. | | |
| 6,170,049 B1 | * | 1/2001 | So | ............................... | 712/35 |

* cited by examiner

*Primary Examiner*—Ario Etienne
(74) *Attorney, Agent, or Firm*—Mintz, Levin, Cohn, Ferris, Glovsky & Popeo, P.C.

(57) ABSTRACT

A signal processing system includes a control processor that has a bi-directional port, signal processors that each have a serial port, a bridge that has serial ports each operatively connected to a serial port of one of the signal processors, and a bi-directional port operatively connected to the bi-directional port of the control processor.

37 Claims, 4 Drawing Sheets

PROCESSOR INTERCONNECTION

FIELD OF THE INVENTION

This invention relates generally to methods of interconnecting processor circuits, and more particularly to methods of interconnecting large numbers of signal processors to a general-purpose computer bus using serial interfaces.

BACKGROUND OF THE INVENTION

Since the development of the earliest computers, there has been a trend toward increasing the size and complexity of bus architectures in general-purpose computers. Increases in bus width have allowed for performance improvements, because a wider bus can carry more information at a given speed. Increases in complexity have added a range of functions, such as bus mastering, bus segmentation, automatic configuration, and high-speed burst transfer capabilities to older, simpler microprocessor interfaces, which typically only included data lines, address lines, and a few control lines.

Although the newer architectures are more complicated, some of them, such as the so-called Peripheral Component Interconnect (PCI) bus, have received widespread industry acceptance. The resulting economies of scale have lead to reductions in the cost of compatible peripherals that more than outweigh the higher complexities of the bus standard, and integrated circuit manufacturers have responded to this trend by developing bridge circuits to capitalize on the benefits of these newer bus structures. These typically include circuitry that interfaces with the more complex general-purpose bus architectures connected to circuitry that interfaces with the simpler bus control interfaces of one or more peripheral integrated circuits.

SUMMARY OF THE INVENTION

In one general aspect, the invention features a signal processing system that includes a control processor that has a bi-directional port, signal processors that each have a serial port, a bridge that has serial ports each operatively connected to a serial port of one of the signal processors, and a bi-directional port operatively connected to the bi-directional port of the control processor.

The bridge can include bus mastering circuitry operatively connected to further bus mastering circuitry on a bus that operatively connects the control processor and the bridge. The bridge can include bus arbitration circuitry. The bridge can include buffer storage areas each responsive to one of the serial ports. The signal processors can each include local, parallel-word, random-access memory. The signal processors can each include a dedicated multi-bit shifter circuit, and a dedicated parallel-word multiplier circuit. The signal processors can each include digital signal processing code. The signal processors can each include media processing code. The signal processors form parts of different integrated circuits. The signal processors, the control processor, and the bridge can form parts of different integrated circuits. The signal processors, the control processor, and the bridge can be housed within a single computer system housing. The signal processors and the bridge can be located on a common circuit substrate. The serial ports of the bridge can be directly connected to the serial ports via a serial line that operates at least about 1 MHz. The serial ports of the bridge can be directly connected to the serial ports via a serial line that operates at least about 50 MHz. The bidirectional port can be a parallel port.

The bridge can include bus mastering circuitry operatively connected to further bus mastering circuitry on a bus that operatively connects the control processor and the bridge. The bus can be a segmented bus with the control processor and bridge interconnected within a first segment that is operatively connected to other bus segments via further inter-segment bridges. The bus can be a segmented bus with the control processor and the bridge being interconnected by an inter-segment bridge. The serial ports of the bridge can each include a data ready input, a clock output, and clock stalling circuitry responsive to the data ready input and operatively connected to the clock output. The bridge can include bus arbitration circuitry with the bus arbitration circuitry being operatively connected to the clock stalling circuitry.

In another general aspect, the invention features a signal processing system that includes processor means having a bidirectional port, a plurality of signal processing means each having a serial port, and means for transferring data between the bidirectional port and the serial ports.

The means for transferring data can include means for requesting mastery of an interconnection path between the means for transferring and the processor means. The signal processing means can include media signal processing means. The signal processing means can each include means for locally storing and retrieving data. The bidirectional port can be a parallel port. The means for transferring data can include means for stalling a clock associated with one of the signal processors in response to a request from one of the signal processing means.

In a further general aspect, the invention features a signal processing method that includes computing with a first processor, computing with a second processor, shifting a first data word between the first processor and a bridge, shifting a second data word between the second processor and a bridge, parallel transferring the first data word between a third processor and the bridge, and parallel transferring the second data word between the third processor and the bridge.

The first and second steps of shifting can respectively shift the first and second data words from the first and second processors to the bridge, with the steps of parallel transferring transferring the first and second data words from the bridge to the third processor after the steps of shifting, and further including the step of storing the first data word in the bridge after the step of shifting the first data word and before the step of parallel transferring the first data word, and the step of storing the second data word in the bridge after the step of shifting the second data word and before the step of parallel transferring the second data word. The method can include issuing and granting a bus mastering request before at least one of the steps of parallel transferring to permit the at least one of the steps of parallel transferring. The step of computing the data word can include performing at least one media manipulation operation. The step of computing can include steps of storing and retrieving data in local processor memory.

In another general aspect, the invention features a bus bridge that includes serial ports, serial port interfaces operatively connected to the serial ports, a primary data port, and a primary data port interface operatively connected to the primary data port. The primary data port interface includes storage for burst transfers from the bus. The bridge further includes a data path between the serial port interfaces and the general-purpose bus interface and control circuitry operatively connected to the serial ports and to the general-purpose bus interface.

The control circuitry can include arbitration circuitry to arbitrate between requests from the serial ports to transfer data from the serial ports to the bus. The primary data port interface can include bus mastering logic to request master control of a general purpose bus in response to bus mastering requests from the serial ports. Each of the serial port interfaces can include a buffer storage area. The primary data port can include a connector adapted to interface with a segmented general-purpose bus with the primary data port interface enabling the bridge to communicate with processors through at least one inter-segment bridge separating segments of the general-purpose bus. The serial ports can include two data lines and two handshaking lines. The serial ports of the bus bridge can each include a data ready input, a clock output, with the serial port interfaces each including clock stalling circuitry responsive to the data ready input and operatively connected to the clock output. The bridge can further include bus arbitration to arbitrate between requests from the serial ports to transfer data from the serial ports to the bus, with the arbitration circuitry being operatively connected to the clock stalling circuitry.

In a further general aspect, the invention features a bus bridge that includes a plurality of means for communicating serial data signals, means for communicating parallel data signals, and means for transferring bursts of data signals between the plurality of means for communicating serial data signals and the means for communicating parallel data signals.

The bridge can include means for performing an arbitration to determine the relative priorities of data for the plurality of means of communicating serial data signals. The means for transferring can include means for causing the means for communicating parallel data signals to request bus master control in response to bus mastering requests from the means for communicating serial data signals. Each of the means for communicating serial data signals can include means for storing serial signals. The plurality of means for communicating serial data signals can each include means for stalling a clock in response to a transfer request signal.

In another general aspect, the invention features a signal interfacing method that includes selecting a first of a plurality of serial data ports in a bus bridge, communicating bursts of serial data signals between the first of the plurality of serial data ports and a primary data port, wherein the step of communicating bursts of serial data signals includes communicating an address word and a plurality of data words, selecting a second of the plurality of serial data ports in a bus bridge, and communicating bursts of further serial data signals between the first of the plurality of serial data ports and the primary data port, wherein the step of communicating bursts of further serial data signals includes communicating an address word followed by a plurality of data words. The method can further include the steps of requesting mastership of a communication medium and receiving mastership of the medium before the steps of communicating serial data signals with the steps of communicating taking place over the communication medium.

In a further general aspect, the invention features a bus bridge that includes a plurality of serial ports, a plurality of serial port interfaces operatively connected to the serial ports, a primary data port, and a primary data port interface operatively connected to the primary data port, with the primary data port interface including bus mastering capabilities. The bridge also includes a data path between the serial port interfaces and the general-purpose bus interface and control circuitry operatively connected to the serial ports and to the general-purpose bus interface.

The control circuitry can include arbitration circuitry to arbitrate between requests from the serial ports to transfer data from the serial ports to the bus. The primary data port interface can include bus mastering logic to request master control of a general purpose bus in response to bus mastering requests from the serial ports. Each of the serial port interfaces can include a buffer storage area. The primary data port can include a connector adapted to interface with a segmented general-purpose bus and the primary data port interface can enable the bridge to communicate with processors through at least one inter-segment bridge separating segments of the general-purpose bus. Each of the serial ports can include two data lines and two handshaking lines. The serial polls of the bus bridge can each include a data ready input, a clock output, with the serial port interfaces each including clock stalling circuitry responsive to the data ready input and operatively connected to the clock output. The bridge can further include bus arbitration circuitry to arbitrate between requests from the serial ports to transfer data from the serial ports to the bus, with the arbitration circuitry being is operatively connected to the clock stalling circuitry.

In another general aspect, the invention features a bus bridge that includes a plurality of means for communicating serial data signals, means for communicating parallel data signals, and means for transferring data signals between the plurality of means for communicating serial data signals and the means for communicating parallel data signals, wherein the means for transferring includes bus mastering means.

The bridge can include means for performing an arbitration to determine the relative priorities of data for the plurality of means of communicating serial data signals. The means for transferring can include means for causing the means for communicating parallel data signals to request bus master control in response to bus mastering requests from the means for communicating serial data signals. Each of the means for communicating serial data signals can include means for storing serial signals. The plurality of means for communicating serial data signals can each include means for stalling a clock in response to a transfer request signal.

In a further general aspect, the invention features a signal interfacing method that includes selecting serial data ports in a bus bridge, communicating serial data signals between the serial data ports and a primary data port, selecting a second of the plurality of serial data ports in a bus bridge, and communicating further serial data signals between the first of the plurality of serial data ports and the primary data port.

Systems according to the invention may be advantageous in that they permit the manufacture of low-cost, high efficiency, multi-processor circuits, such as media signal processing peripherals for general-purpose computers. Because such systems employ serial interfaces that require fewer interconnections, they can be smaller, less expensive, or both. The serial interfaces may also include fewer high-power interface driver circuits than do full-width parallel bus interfaces, so that power consumption of the peripheral can be reduced. In addition, although each serial interface may have a lower bandwidth than a high-speed burst-based bus with which it exchanges data, the overall throughput between the signal processors and the bus can approach that of the bus itself. And by interweaving this serial topology with a scalable segmented bus architecture, an interdependent clustered structure that compounds the above advantages can be achieved.

DETAILED DESCRIPTION OF AN ILLUSTRATIVE EMBODIMENT

Figure 1:
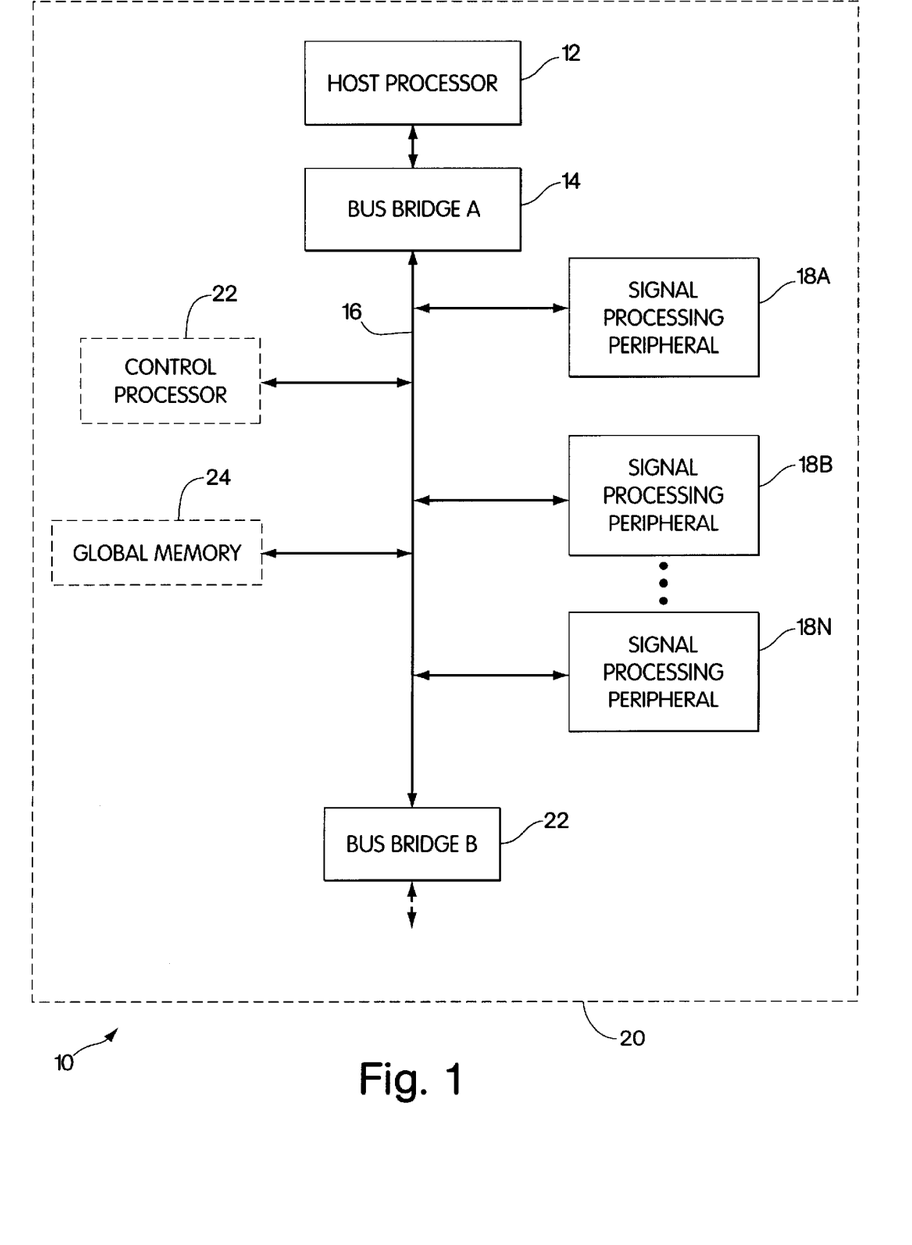
FIG. 1 is a block diagram of a signal processing system according to the invention.

Referring to FIG. 1, a scalable media signal processing system 10, which can be used as a voice processing system or a media streaming system, comprises a system housing 20 that includes a host processor 12 operatively connected to a host bus segment of a general-purpose computer bus. A first expansion bridge 14 interconnects the host bus segment and a first expansion bus segment 16. The expansion bridge includes bus mastering circuitry operatively connected to bus mastering circuitry on the host bus segment and on the first expansion segment, to allow it to act as a bus master on one of the buses on behalf of a peripheral device on the other.

The first expansion bus segment 16 is operatively connected to a series of signal processing peripherals 18A, 18B, . . . 18N via parallel, bidirectional bus ports. Operatively connected to the first expansion bus segment in scalable systems can be global memory 24 and a control processor 22 that performs signal processor interface and/or control functions that the host processor would otherwise undertake, including loading startup programs and transferring media data, commands, and events to and from the various peripherals. One or more further bus bridges 26 can also link one of the bus segments to further bus segments.

Figure 2:
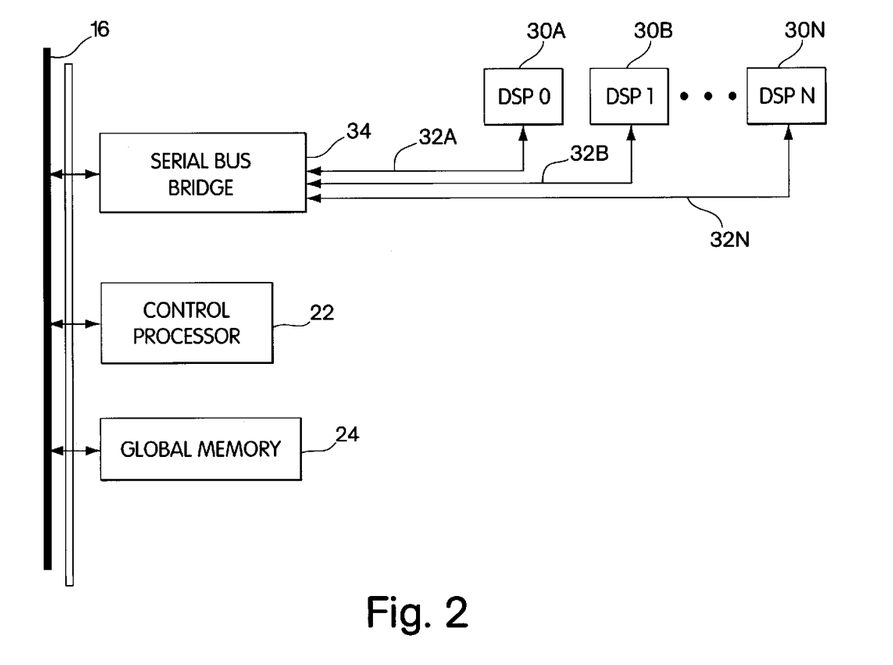
FIG. 2 is a block diagram of a peripheral for use in the system of FIG. 1.

Referring also to FIG. 2, each signal processing peripheral (e.g., 18A) includes a number of signal processors 30A, 30B, . . . 30N (DSP's). Each of the signal processors has a serial interface that is operatively connected to one of a number of serial interfaces on a serial bus bridge 34 via one of a number of respective serial connections 32A, 32B, . . . 32N. The serial interfaces all have a small set of interface lines that can each include data and handshaking lines. In one embodiment, the serial interfaces each include two clock lines, two data lines, and two handshaking lines used with a serial packet-based protocol, although a number of variants are possible, depending on the exact interface architecture and communication protocol. In any case, the serial interfaces should each have significantly fewer lines than the general-purpose computer bus 16. In one embodiment employing a PCI bus, the general-purpose interface includes 124 lines for a 32-bit bus and 184 lines for a 64-bit bus. The PCI bus standard is described in PCI Local Bus Specification, Rev. 2. 1, Jun. 1, 1995, available from the PCI Special Interest Group, 2575 NE Kathryn St. #17, Hillsboro, Oreg. 97124, and which is herein incorporated by reference.

Each of the signal processors 18A, 18B, . . . 18N can be a digital signal processor integrated circuit with on-chip or local, parallel-access, random-access memory (RAM), as well as a dedicated serial interface that is capable of interrupting its processing. As is well known, digital signal processors are high-speed processors that include features permitting them to process digital signals, such as video and audio (media) signals, in real time or at a high throughput. To this end, digital signal processors generally include special-purpose digital signal processing circuitry such as dedicated multi-bit shifters, and dedicated multipliers capable of multiplying two full words. In one embodiment, the digital signal processors are members of the TI C54X family, which are available from Texas Instruments and include asynchronous serial ports with Direct Memory Access (DMA) capabilities.

Figure 3:
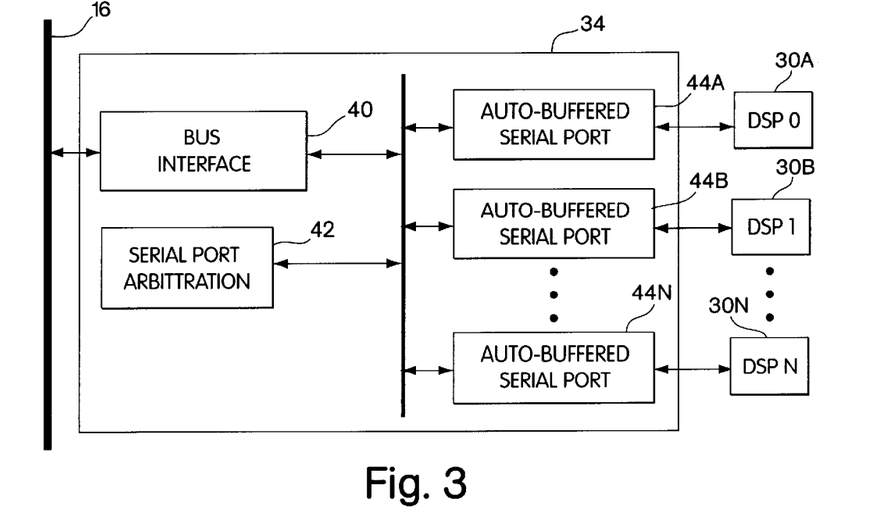
FIG. 3 is a block diagram of a bus bridge for use in the peripheral of FIG. 2.

Referring also to FIG. 3, the serial bus bridge 34 includes a number of auto-buffered serial port circuits 44A, 44B . . . 44N, which are respectively connected to the serial interface connections 32A, 32B, . . . 32N. Each of these serial port circuits can include incoming and/or outgoing first-in-first-out (FIFO) buffers and throttling logic connected to corresponding handshaking lines to prevent its incoming FIFO from being overfilled. The auto-buffered serial port circuits are also each operatively connected to an internal bus 46, which is in turn connected to general-purpose bus interface logic 40 and to a serial port arbitration unit 42. The bus interface logic has bus interface circuitry to interact with the general purpose computer bus 16, including such circuitry as address decoding logic, caching and prefetching logic, as well as bus mastering request and acknowledge lines operatively connected to bus mastering logic to request bus mastery on local and remote bus segments.

The serial port arbitration unit 42 includes circuitry to maintain and enforce a servicing priority hierarchy among the serial lines. This priority hierarchy can be one of a number of different types, such as: fixed priority, programmable priority, round-robin, least-recently-used, or most-full FIFO. The serial port arbitration unit can also enforce a bus mastering hierarchy for requests by the serial port circuits to become masters of the local or remote bus segments.

In operation, each signal processor 30A, 30B, . . . 30N can include a start-up routine, or it can receive some or all of its start-up routine from a control processor that can be the host processor 12 or the optional local control processor 22. To transfer program code or data to be processed from the control processor to one of the signal processors, the control processor places a packet including an address followed by a burst of data words on the first expansion bus segment 16, either directly or via an inter-segment bridge (e.g., 14). The bus interface 40 of the serial bus bridge 34 decodes the address, determines which signal processor the burst is intended for, and routes the data words to the auto-buffered serial port circuit 44A, 44B, . . . or 44N specified by the address. Upon receipt of this burst, the serial port begins transmitting it to the signal processor corresponding to that serial port. In addition to the outgoing FIFO, caching logic in the serial bus bridge can buffer the data as it is transferred from the bus to the serial line.

To transfer data from a particular signal processor, (e.g., 30B) to the host processor 12, control processor 22, global memory 24, or to another destination, the signal processor seeking a transfer sends its data via its serial interface 32B to the corresponding auto-buffered serial port circuit 44B.

Depending on the serial architecture, these data can be formatted as a packet that includes a fixed-length header with a count that indicates how long the packet will be followed by a burst of data. It is also possible to include in the header an identifier that identifies the sending processor. In some embodiments, the header information may be added by the bridge, rather than the signal processor.

As the serial bridge receives the data, its serial port arbitration unit 42 determines which currently-active serial port now has priority and transfers the received data for that serial port to the bus 16 via the bus interface logic first. Note that in this embodiment, several or all of the signal processors can transfer data to their respective serial port buffers at the same time, and the serial port arbitration unit will cause the bus interface logic to serve them according to its priority hierarchy.

The serial port arbitration unit 42 can also perform bus mastering. In this mode, a signal processor (e.g., 30A) can send a command signal to the serial bus bridge 34 requesting to become the master of at least one segment of the general purpose bus. If bus mastering is enabled, and this signal is the highest priority bus-mastering request, the serial port arbitration unit will cause the bus interface logic 40 to request access to the first expansion segment of, or possibly other segments of, the general purpose bus. Once the general purpose bus has been relinquished to the bus bridge, the signal processor can interface with the bus through its serial link 32A. The bridge can then relinquish the general purpose bus.

Figure 4:
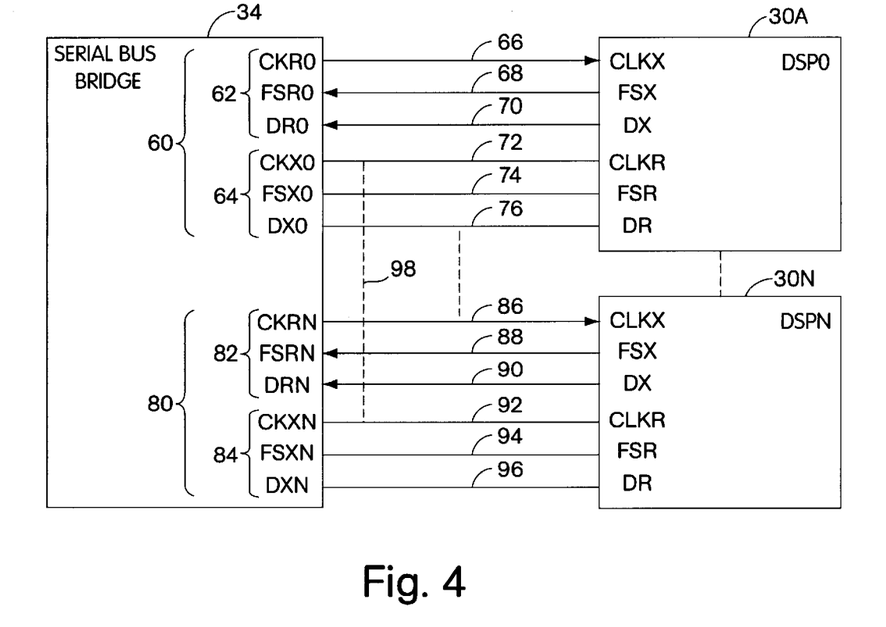
FIG. 4 is a block diagram of serial interface connections for use in the system of FIG. 1.

Referring to FIG. 4, the signal processors 30A . . . 30N can connect to the serial bus bridge 34 via a six-line serial connection. A first serial port 60 of this type of serial bus bridge includes an input port 62 with a receive clock output CKR0, a frame start receive input FSR0, and a data receive input DR0. The receive clock output is operatively connected to a receive clock input CLKX in the first digital signal processor 30A via a receive clock line 66. The frame start receive input is operatively connected to a frame start receive output FSX of the first digital signal processor via a frame receive line 68. The data receive input DR0 is operatively connected to a data receive output DX of the first digital signal processor via data receive line 70.

An outgoing port 64 of the serial port 60 of the serial bus bridge 34 also includes a transmit clock output CKX0, a frame start output FX0, and a data output DX0. The transmit clock output is operatively connected to a receive clock input CLKR of the first digital signal processor 30A via a transmit clock line 72. The frame start transmit output FSX0 is operatively connected to a frame start receive input of the first digital signal processor via a frame start receive line 74. The data transmit output DX0 is operatively connected to a data receive input DR of the first signal processor via a data transmit line 76.

Further serial ports can include similar connections. For example, an n-th port 80 can include a receive port 82 with a receive clock output CKRN, a frame start input FSRN, and a data receive input DRN respectively operatively connected to a transmit clock input CLKX, a frame start output FSX, and a data output DX of an n-th signal processor 30N via an incoming clock line 86, an incoming frame start line 88, and an incoming data line 90. Similarly, an outgoing port 84 can include a transmit clock output CKXN, a transmit frame start output FSXN, and a data output DXN respectively operatively connected to a receive clock input CLKR, a receive frame start input FSR, and a data receive input DR of the n-th signal processor via an outgoing clock line 92, an outgoing frame start line 94, and an ongoing data line 96.

Figure 6:
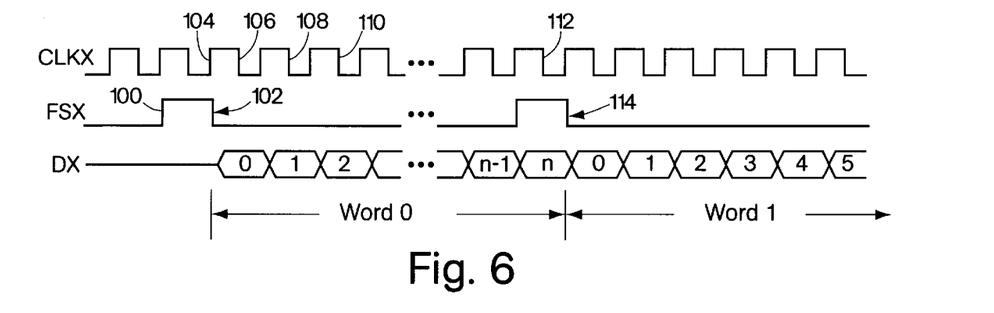
FIG. 6 is a timing diagram for the beginning of a serial transfer between a signal processor and an idle bus bridge for the connection of FIG. 4.
Figure 7:
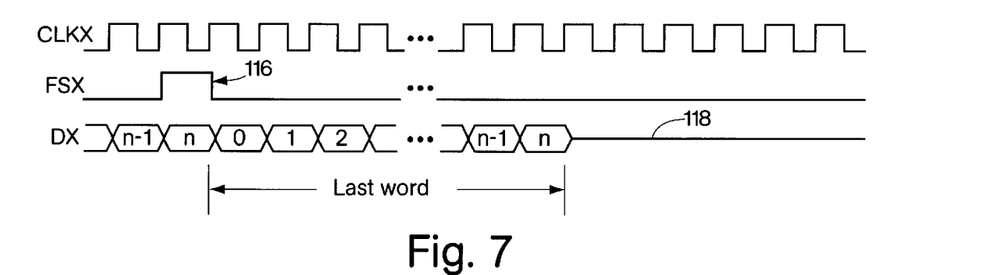
FIG. 7 is a timing diagram for the end of the serial transfer shown in FIG. 6.

In operation, referring to FIGS. 3 and 6–7, the serial bus bridge 34 begins to receive data from the digital signal processor in response to the rising edge 100 of a frame signal start pulse 102. This rising edge signals that a first data bit 0 will be placed on the incoming data line 70 after the serial bus bridge supplies the next rising edge 104 of the clock signal CLKX. The bus bridge samples this data bit on the next falling edge 106 of the clock. Similarly, the serial bus bridge samples further data bits (1, 2 . . . n) of a first word (Word 0)) on successive falling edges of the clock (108, 110 . . . 112). This process can be repeated without any wait states for a second word (Word 1) in response to a second frame start pulse 114. After clocking a final word in a burst (Last Word) from a digital signal processor into the serial bus bridge in response to a final frame start pulse 116, the data line becomes idle 118.

Figure 5:
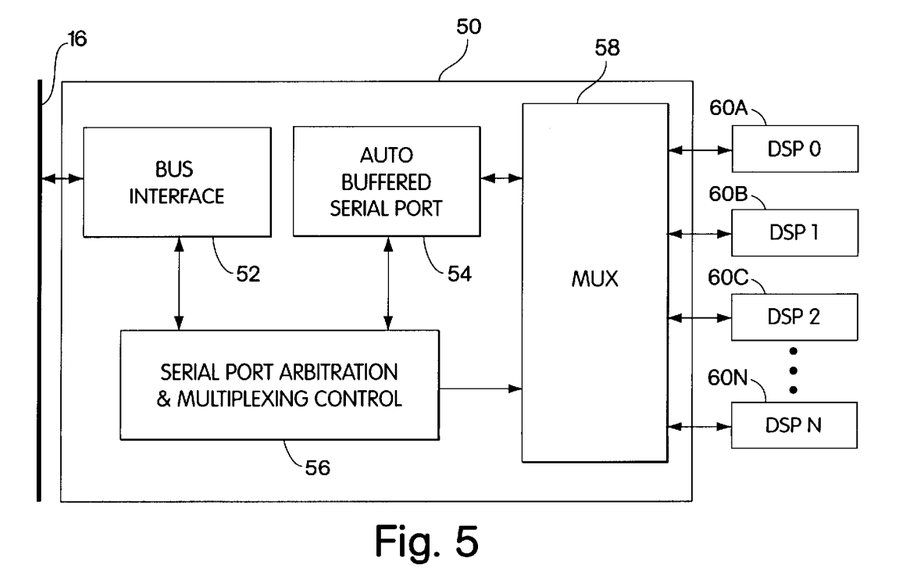
FIG. 5 is a block diagram of an alternative bus bridge for use in the peripheral of FIG. 2.
Figure 8:
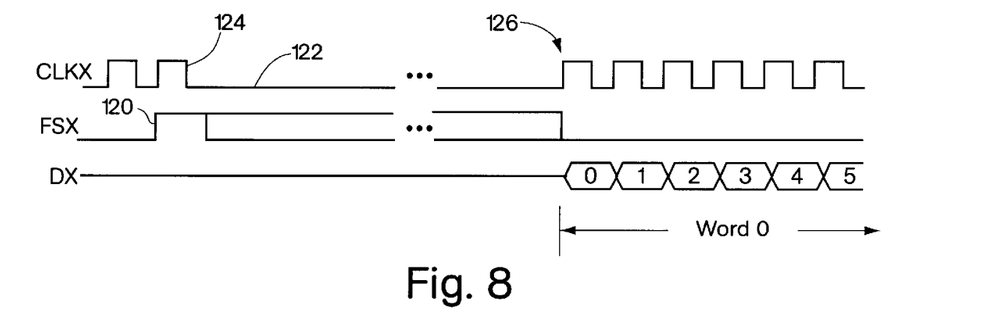
FIG. 8 is a timing diagram for the beginning of a serial transfer between a signal processor and a busy bus bridge for the connection of FIG. 4.
Figure 9:
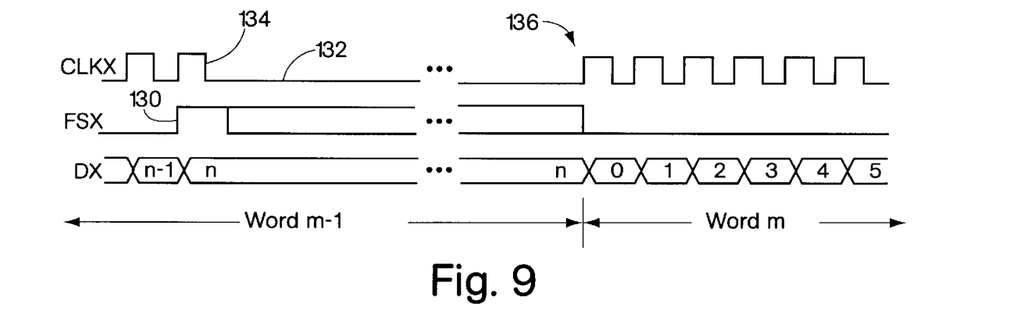
FIG. 9 is a timing diagram for a suspended serial transfer between a signal processor and a bus bridge during the servicing of a higher priority signal processor, for the connection of FIG. 4.

Referring to FIGS. 5, 8, and 9, if the serial bus bridge 34 is not ready to receive serial data, it can cause the signal processor (e.g., 30A) to hold off sending data temporarily. This may be necessary when a buffer for the serial port for that signal processor is full. In circuits without a buffer, the serial bus bridge may have to hold off a transfer when it is servicing a request by a signal processor having a higher priority. In either case, the operation can begin with a request for transfer from one of the signal processors in the form of a rising edge 120 on the frame start line 68. If the serial bus bridge needs to delay the request, it holds the receive clock output CKR0 in its low state at 122 after its next falling edge 124. This prevents the signal processor from placing any data on the incoming data line 70. The serial bus bridge can maintain this state until it is ready to accept data, at which time it resumes operation of the clock with a sequence of pulses 126 that begins to cause the signal processor to place a first word (word 0) on the data line.

Referring also to FIG. 8, the serial bus bridge 34 can also interrupt a transfer in a similar manner. This will usually take place on a word boundary within a packet. When the serial bus bridge determines that it needs to interrupt the data flow from a signal processor (e.g., 30A), it places its receive clock output CRK0 in its low state 132 following its first falling edge 134 after the rising edge 130 of the next frame start pulse. This causes the digital signal processor to leave the last bit n of the current word (Word m−1) on the data line 70. When the serial bus bridge is ready to resume reception, it issues another set of clock pulses 136 which cause the signal processor to place successive bits (0,1 . . . n) of a next word (word n) on the data line.

Outgoing transfers can also employ the outgoing handshaking method described above in connection with incoming transfers, although this may not be necessary. If some or all of the signal processors are configured to receive serial data at any time, some or all of the outgoing clock lines CKX0 . . . CKRN can be free running. The processors that receive free-running clocks can all receive the same clock signal from a single outgoing clock line 98.

Referring to FIG. 5, an alternative serial bus bridge 50 includes bus interface logic 52 that is operatively connected to the general-purpose bus 16 and to a single auto-buffered serial port circuit 54. The auto-buffered serial port 54 has a bidirectional serial port operatively connected to a bidirectional multiplexed data port of a multiplexer 58, which has demultiplexed serial ports operatively connected to a number of signal processors 60A, 60B, 60C . . . 60N. The bridge also includes serial port arbitration and control circuitry 56 that is operatively connected to control lines of the bus interface logic, control lines of the auto-buffered serial port, and to select lines of the multiplexer.

This embodiment uses a single buffered serial port circuit and multiplexes data between it and the signal processors. An advantage of this approach compared with the one previously described is that less circuitry is needed, because it only requires one serial port per bridge rather than one per signal processor. Connections between the bridge and the signal processor can employ somewhat similar interconnections and protocols as those used with the embodiment of FIG. 3, but only a single signal processor is serviced at a time.

The arbitration unit enforces a servicing priority hierarchy among the serial lines to ensure that all processors are serviced. If a round-robin hierarchy is implemented, for example, each signal processor may be allotted a fixed amount of time, such as 20 microseconds, to receive or transmit data. The multiplexing control logic selects which processor is communicating with the bridge at any time.

Because serial interfaces also require fewer interconnections, the peripheral can be smaller and less expensive, and because serial interfaces employ fewer high-power interface driver circuits than do full-width parallel bus interfaces, overall power consumption of each peripheral may be reduced. This is particularly beneficial in connecting large numbers of peripheral devices to a bus, because it will permit a relatively large reduction in peripheral board size and power consumption, resulting in a less expensive and/or more powerful system. In addition, peripheral processors, such as digital signal processors, are particularly well suited to such an architecture since communications between such processors and a host processor can be infrequent, allowing a larger number of processors to be serviced by a single interface. This is because digital signal processors can spend significant amounts of time processing signals between the communication of results or commands.

In one embodiment, the general-purpose bus is a PCI bus, and the host processor 12 is a so-called i86-compatible processor, such as a Pentium® processor available from the Intel corporation. Each segment interfaces with up to four peripherals 18A, 18B, . . . 18D, which each include 32 signal processors 32A, 32B, . . . 32M in the form of 16-bit digital signal processor integrated circuits mounted on a single substrate (e.g., a circuit board). A fully-loaded segment of such a system can have well over a thousand fewer interconnections than it would if it were implemented with parallel interfaces, while still allowing a source processor to communicate PCM-encoded media signals with the signal processors at a sufficient rate to perform full-duplex audio signal processing operations, such as filtering, signal detection, or compression, on media signals with a peak local serial interconnection rate significantly above about 1 MHz. More specifically, with 10–30 millisecond audio packets and an interconnection rate of 50 MHz, worst case timing for such a system should be 26 microseconds (full-duplex), since 10 ms of PCM data encoded at 64 kbs occupies 640 bits. With a 50 microsecond per signal processor time slot, the latency for 32 signal processors in a round robin arbitration is at worst 1.6 milliseconds, not including bus latency associated with to the general-purpose bus. This is a generally acceptable level of latency for many audio signal processing applications.

The systems described above can also employ serial-serial bridges. These can be placed between a serial line of the serial bridge and a number of signal processors to expand the capabilities of the serial bridge. Alternatively, serial-serial bridges can be used to directly interface signal processors with serial ports of source processors using standard serial bus interfaces such as the so-called Universal Serial Bus (USB) or IEEE 1394 (FireWire) interfaces. The USB interface is described in the "Universal Serial Bus Specification", developed by Compaq, Digital Equipment Corporation, IBM PC Company, Intel, Microsoft, NEC, Northern Telecom, Revision 1.0 Jan. 15, 1996. The IEEE 1394 interface is described in "The Facts"About FireWire, Ingrid J. Wickelgren, IEEE Spectrum, April 1997, pages 20–25.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A signal processing system, comprising:
 a control processor having a bidirectional port, and
 a signal processing unit including:
  a plurality of signal processors each having a serial port, and
  a first bridge having a plurality of serial ports each operatively connected to a serial port of one of the signal processors and a bi-directional port operatively connected to the bi-directional port of the control processor through a bus,
 wherein the signal processing unit is configured to act as a master for data transfer from the signal processing unit to the bus.

2. The signal processing system of claim 1 wherein the first bridge includes bus mastering circuitry operatively connected to further bus mastering circuitry on the bus that operatively connects the control processor and the first bridge.

3. The signal processing system of claim 1 wherein the first bridge includes bus arbitration circuitry.

4. The signal processing system of claim 1 wherein the first bridge further includes a plurality of buffer storage areas each responsive to one of the serial ports.

5. The signal processing system of claim 1 wherein the signal processors each include local, parallel-word, random-access memory.

6. The signal processing system of claim 1 wherein the signal processors each include a dedicated multi-bit shifter circuit, and a dedicated parallel-word multiplier circuit.

7. The signal processing system of claim 1 wherein the signal processors each include digital signal processing code.

8. The signal processing system of claim 1 wherein the signal processors each include media processing code.

9. The signal processing system of claim 1 wherein the signal processors form parts of different integrated circuits.

10. The signal processing system of claim 1 wherein the signal processors, the control processor, and the bridge form parts of different integrated circuits.

11. The signal processing system of claim 1 wherein the signal processors, the control processor, and the bridge are housed within a single computer system housing.

12. The signal processing system of claim 1 wherein the signal processors and the bridge are located on a common circuit substrate.

13. The signal processing system of claim 1 wherein the serial ports of the bridge are directly connected to the serial ports via a serial line that operates at least about 1 MHz.

14. The signal processing system of claim 1 wherein the serial ports of the bridge are directly connected to the serial ports via a serial line that operates at least about 50 MHz.

15. The signal processing system of claim 1 wherein the bidirectional port is a parallel port.

16. The signal processing system of claim 15 wherein the first bridge includes bus mastering circuitry operatively connected to further bus mastering circuitry on a bus that operatively connects the control processor and the first bridge.

17. The signal processing system of claim 16 wherein the bus is a segmented bus and wherein the control processor and first bridge are interconnected within a first segment that is operatively connected to other bus segments via further inter-segment bridges.

18. The signal processing system of claim 16 wherein the bus is a segmented bus and wherein the control processor and the first bridge are interconnected by an inter-segment bridge.

19. The signal processing system of claim 1 wherein the serial ports of the first bridge each include a data ready input, a clock output, and clock stalling circuitry responsive to the data ready input and operatively connected to the clock output.

20. The signal processing system of claim 1 wherein the first bridge includes bus arbitration circuitry and wherein the bus arbitration circuitry is operatively connected to the clock stalling circuitry.

21. A bus bridge, comprising:
    a plurality of serial ports,
    a plurality of serial port interfaces operatively and configured to provide serial data ports in a format usable by a digital signal processor
    a primary data port,
    a primary data port interface operatively connected to the primary data port, and configured to provide data to the primary data port in a PCI format
    a data path between the serial port interfaces and the primary data port interface, and
    control circuitry operatively connected to the serial portys and to the primary data port interfaces
    wherein at least one of the primary data port interface and the control circuitry includes mastering logic configured to request master control, of a general purpose bus coupled to the bus bridge, in response to receiving a bus mastering request via at least one of the serial ports.

22. The bus bridge of claim 21 wherein the control circuitry includes arbitration circuitry to arbitrate between requests from the serial ports to transfer data from the serial ports to the bus.

23. The bus bridge of claim 21 wherein the primary data port interface includes bus mastering logic to request master control of the general purpose bus in response to bus mastering requests from the serial ports.

24. The bus bridge system of claim 21 wherein each of the serial port interfaces includes a buffer storage area.

25. The bus bridge system of claim 21 wherein the primary data port includes a connector adapted to interface with a segmented general-purpose bus and wherein the primary data port interface enables the bridge to communicate with processors through at least one inter-segment bridge separating segments of the general-purpose bus.

26. The bus bridge system of claim 21 wherein each of the serial ports includes two data lines and two handshaking lines.

27. The bus bridge of claim 21 wherein the serial ports of the bus bridge each include a data ready input, a clock output, and wherein the serial port interfaces each include clock stalling circuitry responsive to the data ready input and operatively connected to the clock output.

28. The bus bridge of claim 27 further including bus arbitration circuitry to arbitrate between requests from the serial ports to transfer data from the serial ports to the bus, and wherein the arbitration circuitry is operatively connected to the clock stalling circuitry.

29. A signal processing system comprising:
    a control processor; and
    a signal processing peripheral coupled to the control processor through a bus and including:
        a plurality of signal processors each including a serial port; and
        a bridge including a plurality of serial ports, each coupled to a serial port of a signal processor, and an input/output port coupled to the bus;
    wherein the signal processing peripheral is configured to initiate data transfers from the signal processors to the control processor.

30. The signal processing system of claim 29 wherein the signal processors are configured to request to become a master of at least a portion of the bus.

31. The signal processing system of claim 29 wherein the input/output port of the bridge is a parallel port and the bridge is configured to receive serial data from the signal processors and convert these serial data into parallel data and transmit the parallel data to the bus.

32. The signal processing system of claim 29 wherein the bus is a PCI bus and the bridge is configured to translate data received from the signal processors into a format compatible with the PCI bus.

33. The signal processing system of claim 29 wherein the bridge includes:
    at least one buffered serial port coupled to the signal processors;
    a bus interface coupled to the at least one buffered serial port;
    an arbitration unit coupled to the bus interface and to the at least one buffered serial port and configured to arbitrate data transferred between the bus interface and at least two of the signal processors.

34. The signal processing system of claim 33 wherein the bus interface includes mastery logic configured to request mastery of at least a portion of the bus.

35. The signal processing system of claim 33 wherein the arbitration unit includes mastery logic configured to request mastery of at least a portion of the bus.

36. The signal processing system of claim 35 wherein the arbitration unit is configured to request mastery of at least a portion of the bus in response to at least one request signal received from at least one signal processor.

37. A telecommunications signal processing system comprising:
    a digital signal processor configured to produce serial digital data in a digital signal processor format;
    a PCI bus configured to transmit information according to a PCI protocol; and
    a bridge coupled to the digital signal processor through a serial interface and coupled to the PCI bus and configured to translate data received from the digital signal processor in the digital signal processor format into data organized according to the PCI protocol and transmit the translated data to the PCI bus.

* * * * *